US009149157B2

(12) United States Patent
Caplan

(10) Patent No.: US 9,149,157 B2
(45) Date of Patent: Oct. 6, 2015

(54) UNIVERSAL POT LID HANDLING DEVICE AND METHOD

(76) Inventor: Michael Caplan, Boca Raton, FL (US)

(*) Notice: Subject to any disclaimer, the term of this patent is extended or adjusted under 35 U.S.C. 154(b) by 561 days.

(21) Appl. No.: 13/553,257

(22) Filed: Jul. 19, 2012

(65) Prior Publication Data

US 2014/0021213 A1    Jan. 23, 2014

(51) Int. Cl.
A47J 45/10    (2006.01)
B67B 7/18    (2006.01)
B67B 7/06    (2006.01)
B25B 13/48    (2006.01)
B25B 27/00    (2006.01)

(52) U.S. Cl.
CPC ............ A47J 45/10 (2013.01); B67B 7/063 (2013.01); B67B 7/18 (2013.01); B25B 13/48 (2013.01); B25B 13/485 (2013.01); B25B 27/0042 (2013.01)

(58) Field of Classification Search
CPC ............ B67B 7/18; B67B 7/186; B67B 7/44; B67B 7/12; B67B 7/16
USPC .................... 81/3.4, 3.41, 3.42, 3.57, 3.49
See application file for complete search history.

(56) References Cited

U.S. PATENT DOCUMENTS

| 1,349,211 | A | | 8/1920 | Lambert |
| 1,578,816 | A | | 7/1925 | Eifried |
| 1,967,960 | A | * | 7/1934 | McNemar .................. 81/3.42 |
| 2,220,879 | A | | 6/1938 | Hayden et al. |
| 2,249,786 | A | * | 7/1941 | Sacerdote .................. 81/128 |
| 2,622,917 | A | | 10/1947 | Underwood et al. |
| 2,719,444 | A | * | 10/1955 | Zeller ...................... 81/3.42 |
| 2,777,156 | A | * | 1/1957 | Weisgarber ................ 16/361 |
| 2,913,938 | A | * | 11/1959 | Yorba ....................... 81/3.44 |
| 3,126,771 | A | | 7/1962 | Feiler |
| 3,474,486 | A | | 6/1964 | Morris et al. |
| 3,948,477 | A | | 4/1976 | Lample |
| 4,052,917 | A | * | 10/1977 | Gee ......................... 81/3.42 |
| 4,304,670 | A | * | 12/1981 | Watanabe et al. ........... 210/446 |
| 4,949,576 | A | * | 8/1990 | Floyd ...................... 81/3.44 |
| 4,995,295 | A | * | 2/1991 | Floyd ...................... 81/3.44 |
| 5,083,482 | A | * | 1/1992 | Floyd ...................... 81/3.44 |
| 5,385,072 | A | * | 1/1995 | Neff ........................ 81/405 |

(Continued)

FOREIGN PATENT DOCUMENTS

ZA    20000231    1/2000

OTHER PUBLICATIONS www.mairdutchovenlifter.com; "Mair Dutch Oven Lifter", A&B Manufacturing; pp. 1-4, web site last visited Feb. 29, 2012.

Primary Examiner — Hadi Shakeri
Assistant Examiner — Danny Hong
(74) Attorney, Agent, or Firm — Duane Morris LLP; J. Rodman Steele, Jr.; Gregory M. Lefkowitz

(57) ABSTRACT

A universal pot lid handling device is described. The device can include an elongated handle portion and a clamping portion slidably coupled to the handle portion. The handle portion can include a fixed jaw at a distal end thereof and the clamping portion can include a moveable jaw. The fixed jaw and the moveable jaw can have opposing, longitudinally extending gripping portions. The fixed jaw and the moveable jaw can include spacing portions and the gripping portions of the fixed jaw and the moveable jaw can extend from the respective spacing portions. The clamping portion can include a longitudinally extending guide and the handle portion can include a receiving portion adapted to receive the guide.

20 Claims, 5 Drawing Sheets

(56) References Cited

U.S. PATENT DOCUMENTS

| | | | |
|---|---|---|---|
| 6,338,591 B1 * | 1/2002 | Lilienthal, II | 403/326 |
| 6,752,441 B1 | 6/2004 | Morris | |
| 6,854,361 B2 * | 2/2005 | Vandergaw | 81/3.4 |
| 7,481,330 B2 | 1/2009 | Lorthioir et al. | |
| 2008/0006645 A1 | 1/2008 | Sup | |
| 2011/0247461 A1 | 10/2011 | Cero, Jr. | |

* cited by examiner

UNIVERSAL POT LID HANDLING DEVICE AND METHOD

FIELD OF THE DISCLOSURE

The present disclosure relates generally to a universal device for handling pot lids.

BACKGROUND

Cooking vessels, such as saucepans, frying pans, pots, etc. are often covered with a lid during cooking in order to reduce the amount of heat and moisture escaping from the interior of the vessel. This causes food to be cooked faster, reduces the overall energy used during cooking, and holds in moisture to prevent food from drying out. However, lids for cooking vessels often comprise a metal saucer connected to a metal or plastic handle. These commonly used cooking vessel lids can be very dangerous to grab during cooking because the saucer and handle elements are thermally conductive and contacting the lid after it has been on top of a cooking vessel for an extended period of time can cause burns to the user's hands. In addition, steam escaping from the vessel or condensation dripping from the underside of the lid, can also burn the user.

As a solution to this problem, people commonly use a dishtowel or oven mitt to protect their hand when removing a lid from a cooking vessel. While this practice may sometimes prevent a user from burning his or her hands, it can introduce new problems, such as accidentally dropping a portion of a dishtowel into the food being cooked, or accidentally dropping a portion of the dishtowel onto the stove, which may cause the dishtowel to catch on fire. Also, dishtowels and oven mitts are not always clean which presents a sanitary concern should the towel or mitt touch the food or even the chef's hands.

SUMMARY OF THE INVENTION

The universal pot lid handling device described herein can include an elongated handle portion and a clamping portion slidably coupled to the handle portion. The handle portion can include a fixed jaw at a distal end thereof and the clamping portion can include a moveable jaw. The fixed jaw and the moveable jaw can have opposing, longitudinally extending gripping portions for gripping a projection from the lid of a cooking vessel's lid.

At least one of the laterally extending edges can include a recess for receiving a projection. The fixed jaw and the moveable jaw can define a space above the opposing, longitudinally extending gripping portions.

The fixed jaw and the moveable jaw can include spacing portions. The gripping portions of the fixed jaw and the moveable jaw can extend from the respective spacing portions. Each gripping portion can extend generally perpendicularly and/or generally longitudinally from the respective spacing portion. The space can be formed between the gripping portions and the handle portion. The gripping portions can meet along the laterally extending edges when the clamping portion is in a fully retracted position.

The clamping portion can include a longitudinally extending guide and the handle portion can include a receiving portion adapted to receive the guide. The guide and the receiving portion can interact to prevent rotation of the clamping portion.

The clamping portion can include an adjuster, and the handle can include an adjuster receptacle for receiving the adjuster. The adjuster can include a threaded pin and the adjuster receptacle can include a threaded hole adapted for receiving the threaded pin. The device can also include an elastic member disposed between the clamping portion and the handle portion.

These and other features, objects and advantages of the present method and system will become more apparent to one skilled in the art from the following description and claims when read in light of the accompanying drawings.

DETAILED DESCRIPTION

A universal pot lid handling device is disclosed. The pot lid handling device can be secured to a pot lid so that the lid can be easily handled by a chef or other user. In addition, the device is adapted so that the chef's body is sufficiently spaced from the lid that the risk of being burned by the lid, steam escaping from the covered cooking vessel, or hot condensation dripping from the underside of the lid is minimized or eliminated.

Figure 1:
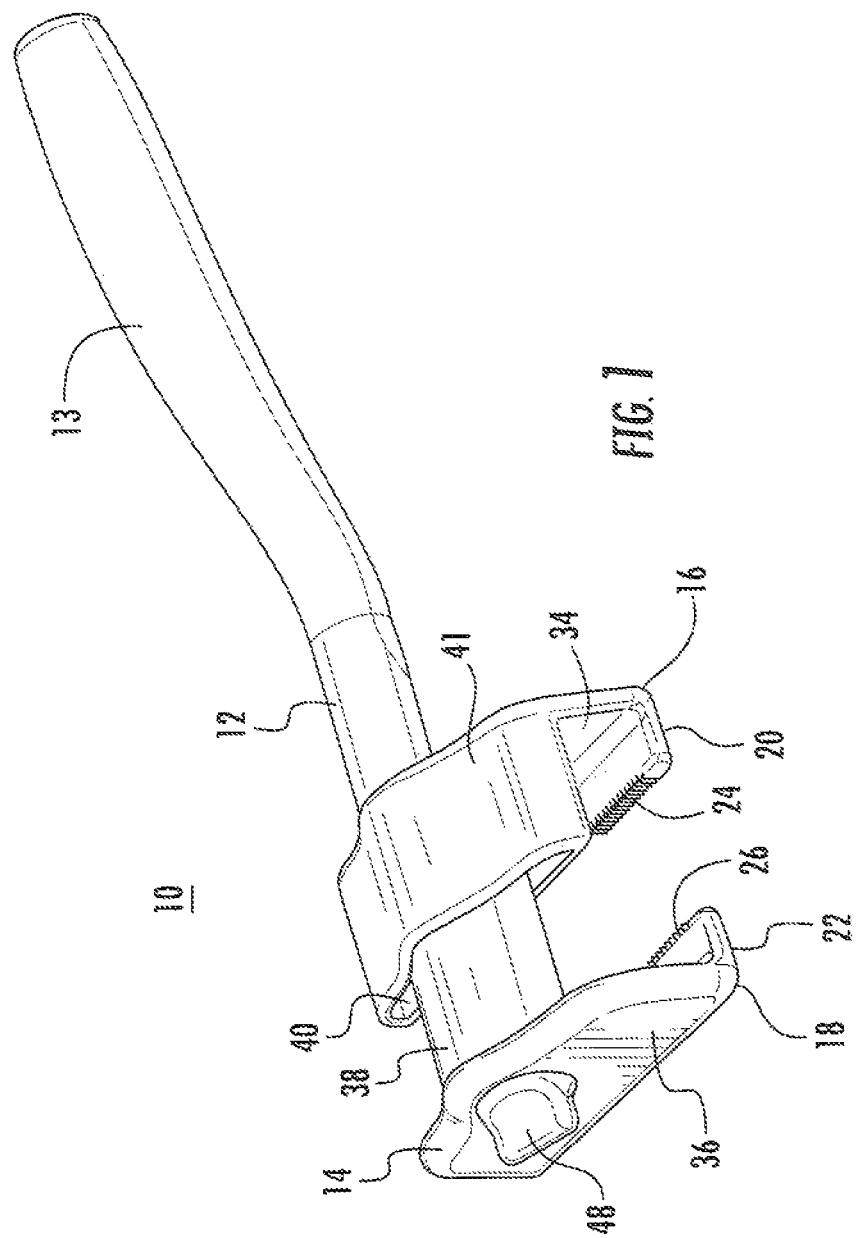
FIG. 1 is a perspective view of a universal pot lid handling device described herein.
Figure 2:
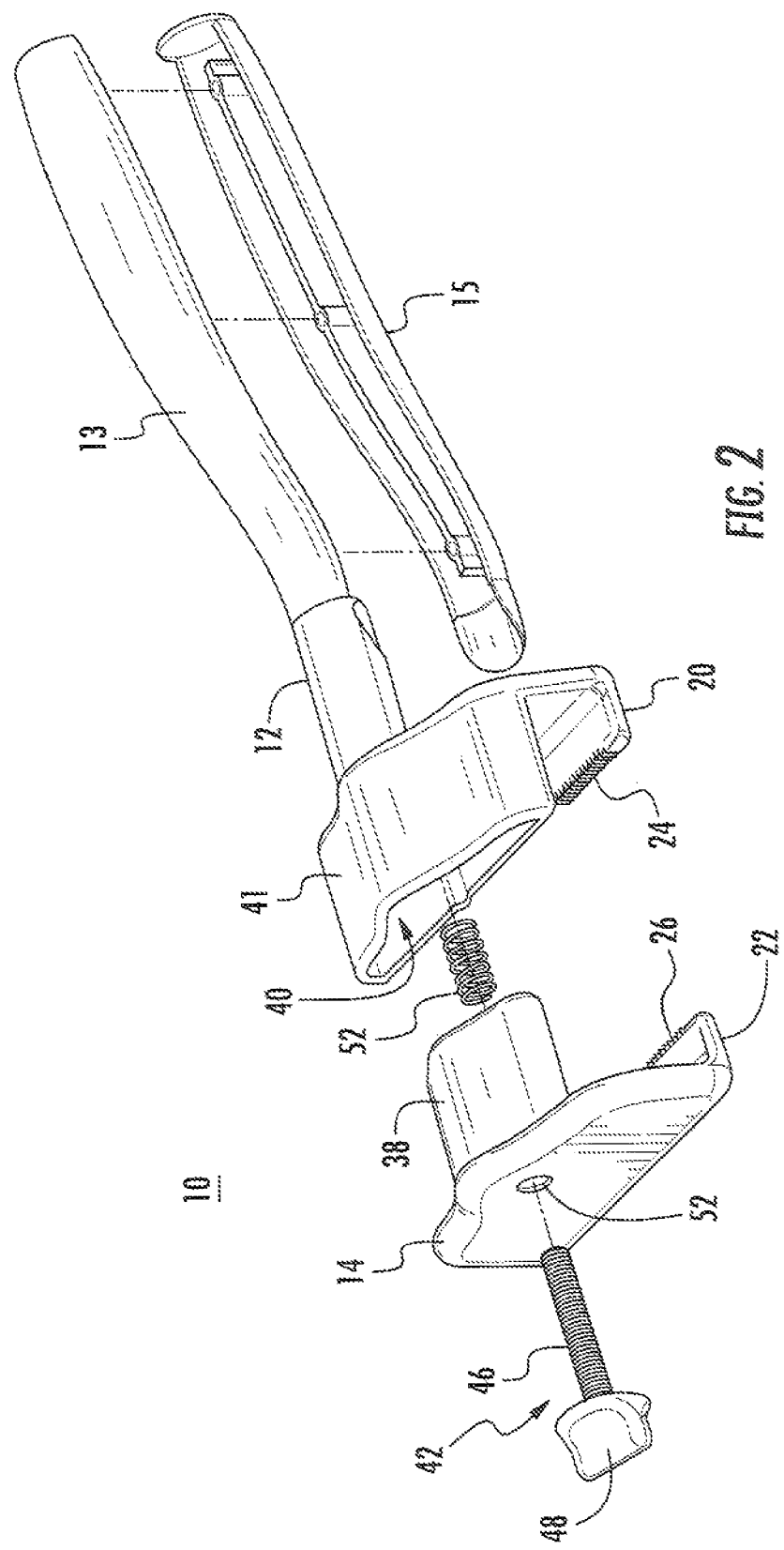
FIG. 2 is an exploded, perspective view of a universal pot lid handling device described herein.

As shown in FIGS. 1-9, the device 10 can include an elongated handle portion 12 and a clamping portion 14 slidably coupled to the handle portion 12. The handle portion 12 can include a handle 13 that extends longitudinally and a fixed jaw 16 at a distal end thereof. The handle 13 can be a unitary or composite structure. As shown in FIG. 2, can be manufactured as a primary portion 13 and a supplemental portion 15. The clamping portion can include a moveable jaw 18. The fixed jaw 16 and the moveable jaw 18 have opposing, longitudinally extending gripping portions 20, 22.

Figure 4:
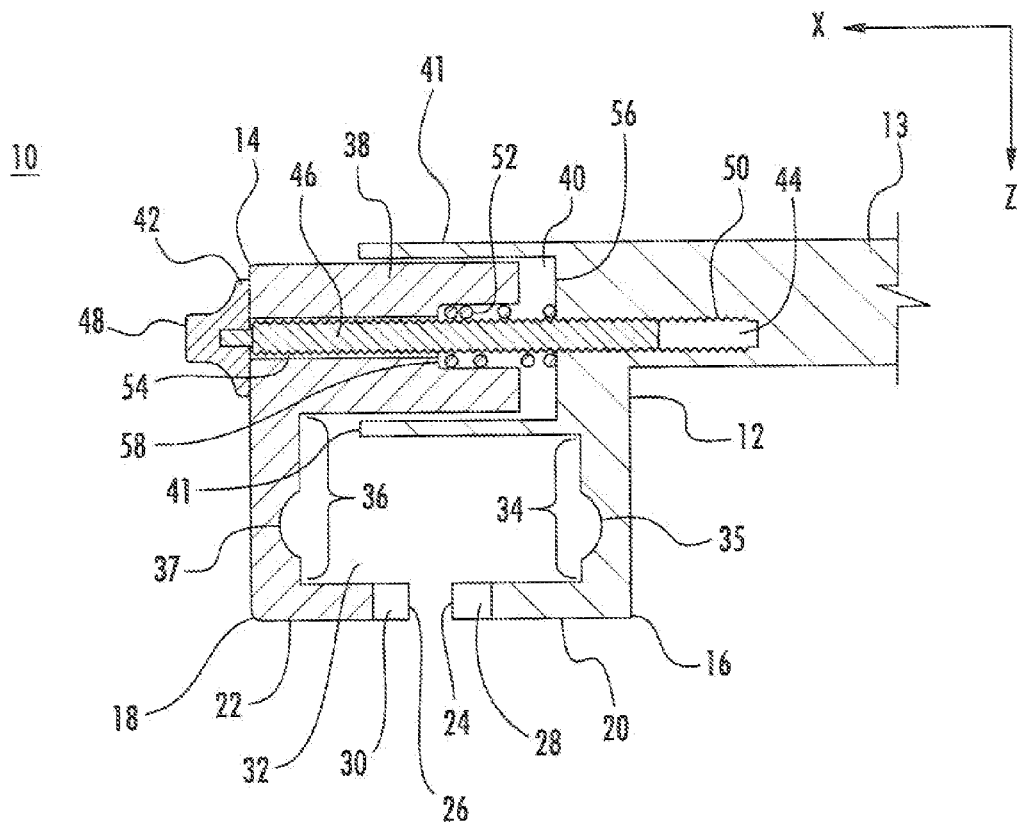
FIG. 4 is a cross-sectional view of the universal pot lid handling device of FIG. 3 taken along cut line 4-4.
Figure 5:
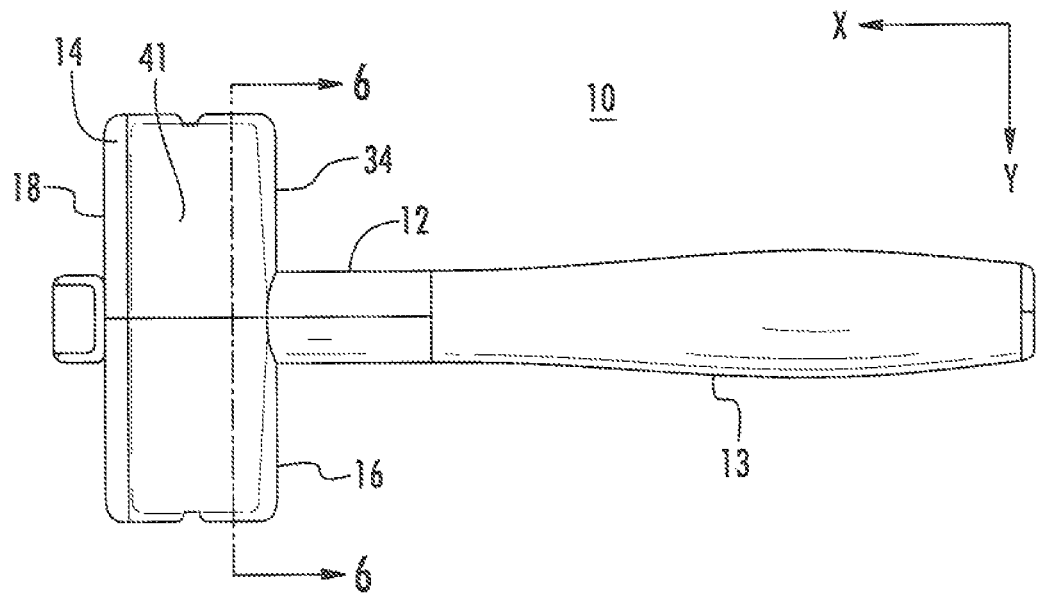
FIG. 5 is a top view of the universal pot lid handling device of FIG. 1.

The opposing, longitudinally extending gripping portions 20, 22 can meet along laterally extending edges 24, 26 when the clamping portion 14 is in a retracted position. Alternately, as shown in FIG. 4, the laterally extending edges 24, 26 can be parallel but spaced apart when the clamping portion 14 is in the retracted position.

Figure 3:
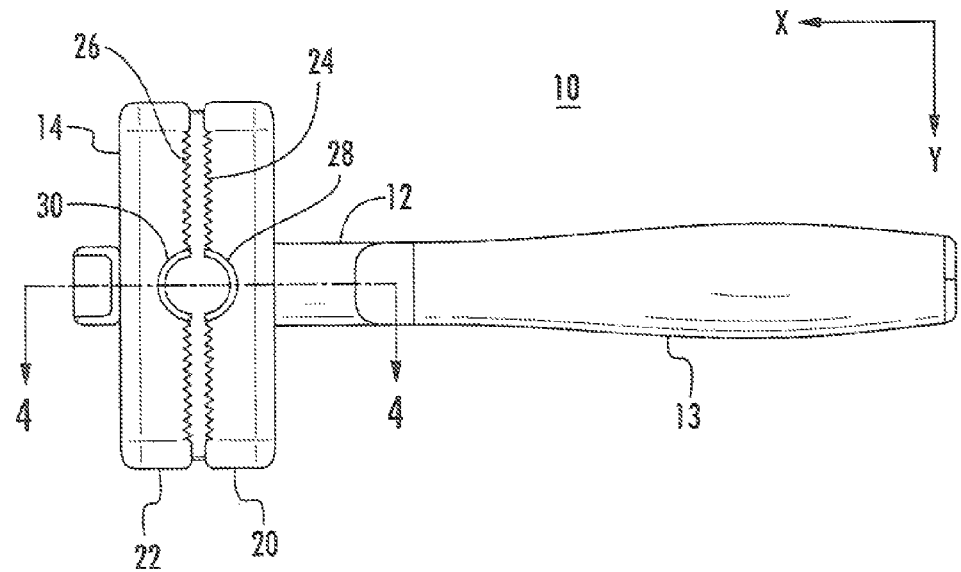
FIG. 3 is a bottom view of the universal pot lid handling device of FIG. 1.
Figure 8:
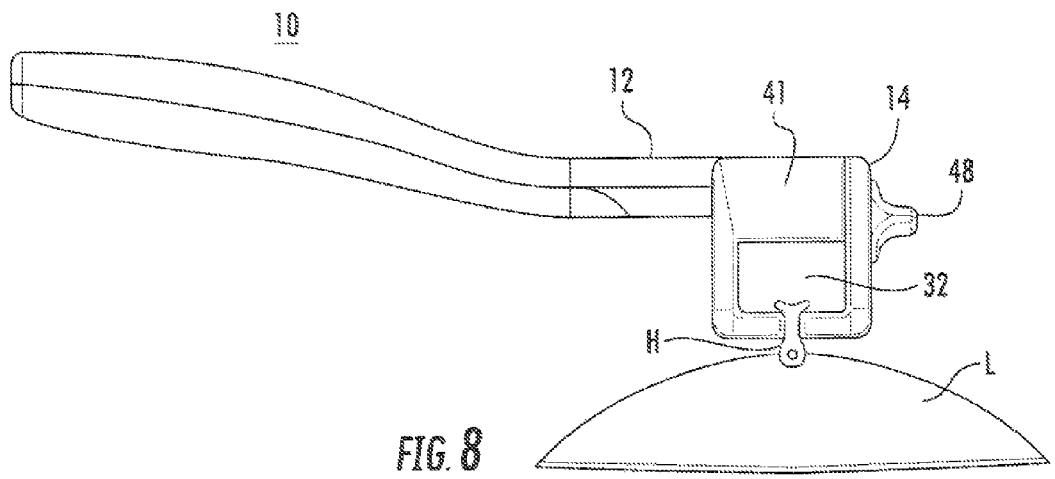
FIG. 8 is a side view of the universal pot lid handling device of FIG. 1 secured to a lid with a handle (H).
Figure 9:
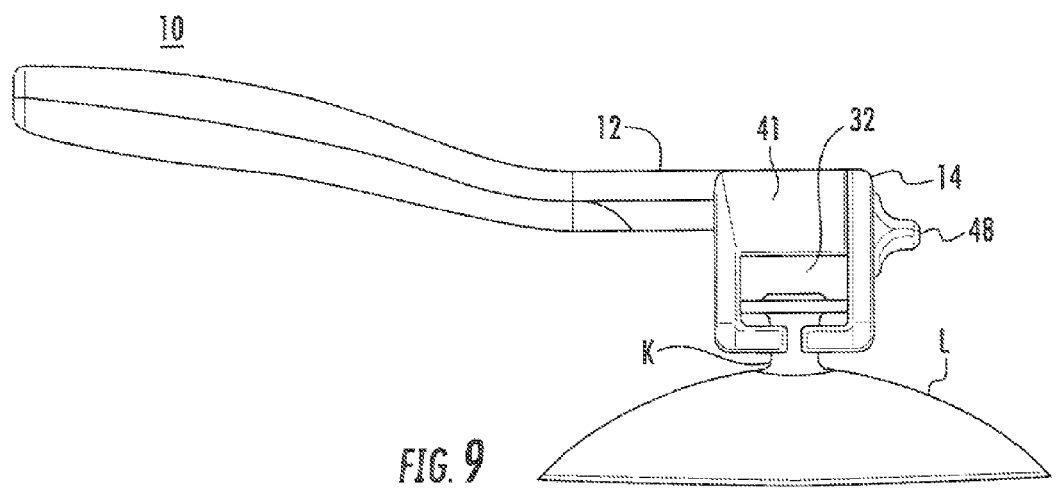
FIG. 9 is a side view of the universal pot lid handling device of FIG. 1 secured to a lid with a knob (K).

As shown in FIG. 3, one or both of the laterally extending edges 24, 26 can include a recess 28, 30 for receiving a projection for handling the lid (L) of a cooking vessel. Exemplary projections include, but are not limited to, handles (H), such as that shown in FIG. 8, and knobs (K), such as that shown in FIG. 9. In particular, the recess(es) 28, 30 can be adapted for receiving a knob (K) and can be positioned proximate the middle of the laterally extending edge(s) 24, 26. Although FIGS. 8 and 9 show the laterally extending edges 24, 26 clamping on the handle (H) at a neck portion, the laterally extending edges 24, 26 can clamp on any portion of the handle (H).

As used herein, the longitudinal direction is designated as the x-axis in the figures, the lateral direction is designated as the y-axis in the figures, and the vertical axis is designated as the z-axis in the figures. As used herein, "longitudinal", "lateral" and "vertical" are intended to include slight variations—e.g., 20° or less, 15° of less, 10° or less, or 5° or less—from the respective axes shown in the Figures. For example, the handle 13 extends longitudinally, even though the proximal end deviates upward of a pure longitudinal direction.

Each of the gripping portions 20, 22 can extend generally perpendicularly from the respective spacing portion 34, 36. As used herein, "generally" relates to a direction that deviates 20° or less from the recited angle/direction, or 15° or less from the recited angle/direction, or 10° or less from the recited angle/direction, or 5° or less from the recited angle/direction.

The fixed jaw 16 and the moveable jaw 18 can define a space 32 above the opposing, longitudinally extending gripping portions 20, 22. As shown in FIG. 4, the fixed jaw 16 and the moveable jaw 18 can include spacing portions 34, 36 and the gripping portions 20, 22 of the fixed jaw 16 and the moveable jaw 18 extend from the respective spacing portions 34, 36. A space 32 can be formed between the gripping portions 20, 22 and the handle portion 12.

As shown in FIG. 4, the spacing portions 34, 36 can include indents 35, 37. The indents 35, 37 can be adapted for further securing and accommodating pot lids with a handle (H) that is wider than the spacing portions 34, 36 would otherwise permit when the laterally extending edges 24, 26 secure the handle (H). Such a handle (H) is shown in FIG. 9.

The position of the space 32 in connection with the two jaws 16, 18 can be particularly helpful for securing the device to conventional knobs (K) or handles (H) attached to lids (L) of cooking utensils. This is because conventional knobs (K) and handles (H) used on lids of cooking utensils generally flare toward their distal ends. Thus, the gripping portions 20, 22 can secure the knob (K) or handle (H) because they exert force on the knob (K) or handle (H), and/or because the flared portion of the knob (K) or handle (H) cannot pass between the gap between the gripping portions 20, 22. The space 32 ensures that there is room for the flared portion of the knob (K) or handle (H) even when the gripping portions 20, 22 exert force on the narrower, necked portion of the knob (K) or handle (H) below the flared portion.

Figure 6:
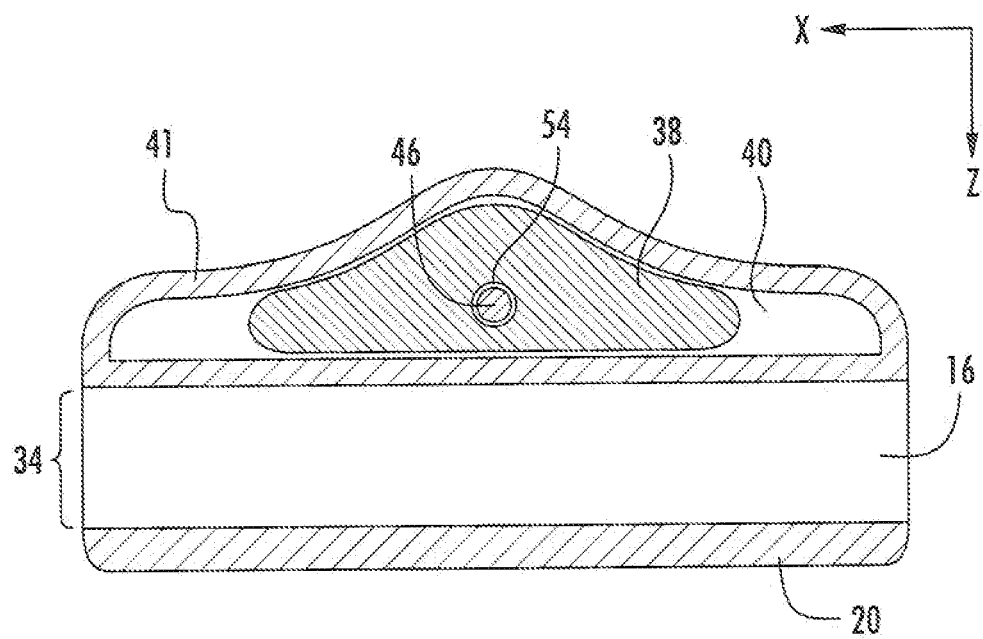
FIG. 6 is a cross-sectional view of the universal pot lid handling device of FIG. 5 taken along cut line 6-6.
Figure 7:
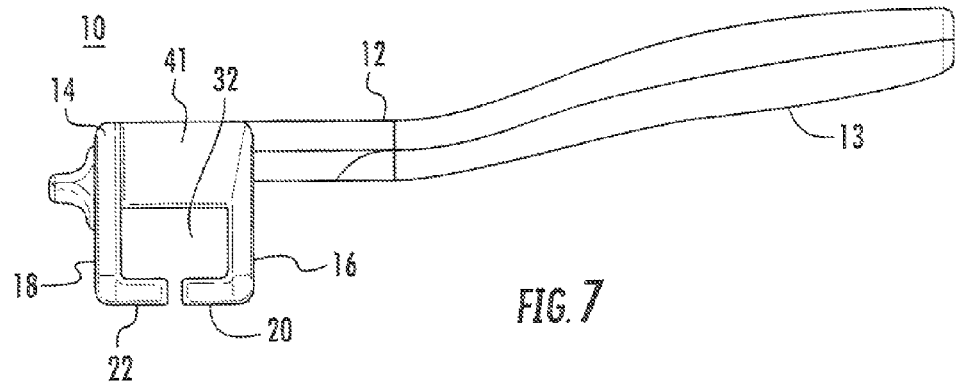
FIG. 7 is a side view of the universal pot lid handling device of FIG. 1.

The clamping portion 14 can include a longitudinally extending guide 38 and the handle portion 12 can include a receiving portion 40 (e.g., a cavity or hole) adapted to receive the guide 38. The receiving portion 40 can be positioned within a housing 41 extending distally beyond the spacing portion 34 of the handle portion 12. The guide 38 and the receiving portion 40 can be designed to prevent rotation of the gripping portion 14 relative to the handle portion 12. For example, as shown in FIG. 6, the guide 38 can have a cross-section that is not circular. Alternately, the guide 38 can include multiple projections and the receiving portion 40 can include one or more receiving portions adapted to receive the multiple projections.

The clamping portion 14 can also include an adjuster 42. The handle can include an adjuster receptacle 44. As shown in FIG. 4, the adjuster receptacle can be located within the receiving portion 40.

The adjuster 42 can include a threaded pin 46 coupled to a dial 48 at one end of the threaded pin 46. The adjuster receptacle 44 can include a threaded hole 50 adapted for receiving the threaded pin 46. The device 10 can also include an elastic member 52 disposed between the clamping portion 14 and the handle portion 12 in order to bias the clamping portion 14 away from the handle portion 12, i.e., to bias the gripping portions 20, 22 apart. Exemplary elastic members 52 include springs, elastomers, rubber, foams, and other materials exhibiting elastic deformation.

The adjuster 42 can pass through an orifice 54 in the clamping portion 14, as well as, the elastic member 52, and then be coupled to the handle portion 12 via the threaded hole 50. As shown in FIGS. 2 & 4, the elastic member 52 can be a spring that contacts an interior surface 56 of the receiving portion 40 and an interior shoulder 58 of the orifice 54. The elastic member 52 can be cylindrical with an longitudinal lumen, such as a spring or washer.

Although not shown, alternate adjuster configurations can useful in connection with the device described herein. For example, the adjuster 42 can include a toothed (e.g., ratcheted) protrusion, while the adjuster receptacle includes a pawl for engaging the toothed protrusion (no shown).

In use, the device 10 can be attached to the lid (L) of a cooking utensil before or while the lid (L) is in use. The adjuster 42 is used to position the opposing, laterally extending edges 24,26 so that they are separated from one another. The knob (K) or handle (H) is then placed between the opposing, laterally extending edges 24, 26 and the adjuster 42 is used to close the gap between the opposing, laterally extending edges 24, 26 and secure the device 10 to the knob (K) or handle (H) of the lid. Where the knob (K) or handle (H) include a necked portion, the laterally extending edges 24, 26 can contact the necked portion while the flared portion rests in the space 32 above the gripping portions 20, 22. FIGS. 8 & 9, show the device 10 secured to a knob (K) and a handle (H) respectively.

As shown in FIG. 3, the recess(es) 28, 30 can be located proximate the center of the laterally extending edges 24, 26. The recess(es) 28, 30 can be particularly adapted for use in connection with lids that employ a flared knob (K). Where the lid (L) employs a handle (H), the two arms of the handle (H) can be secured on opposite sides of the recess(es) 28, 30. In contrast to conventional techniques, such as using a towel or oven mitt, the universal pot lid handling device described herein provides the user with a very secure grip on the lid (L) and greatly reduces—if not eliminates—the risk that the user will be burned handling the lid.

For example, the user can lift the lid (L) and pivot the distal portion of the device upward to remove the lid (L) from a hot cooking vessel. Because of the manner in which the device 10 is configured, this action causes steam within the cooking vessel to escape away from the user and prevents hot condensation on the underside of the lid from dripping on the user. The ergonomic handle 13 also provides a stable means for handling the lid (L) that is far superior to using mitts or towels to grip undersized knobs (K) or handles (H) present in conventional cookware lids.

The foregoing is provided for purposes of illustrating, explaining, an describing embodiments of the method and system. Modifications and adaptations to these embodiments will be apparent to those skilled in the art and may be made without departing from the scope or spirit of this disclosure. In particular, it is intended that each of the variants described above can be combined with any of the other variants described above.

The invention claimed is:

1. A universal pot lid handling device, comprising:
    an elongated handle portion and a clamping portion slidably coupled to said handle portion, wherein said handle portion comprises a fixed jaw at a distal end thereof and said clamping portion comprises a moveable jaw, wherein said fixed jaw and said moveable jaw have opposing, longitudinally extending gripping portions, wherein each of said longitudinally extending gripping portions comprise a laterally extending edge at a distal end thereof and at least one of said laterally extending edges includes a recess for receiving a projection between adjacent portions of a laterally extending edge.

2. The device according to claim 1, wherein said fixed jaw and said moveable jaw define a space above said opposing, longitudinally extending gripping portions.

3. The device according to claim 1, wherein said fixed jaw and said moveable jaw comprise spacing portions and the gripping portions of said fixed jaw and said moveable jaw extend from the respective spacing portions.

4. The device according to claim 3, wherein each gripping portion extends generally perpendicularly from the respective spacing portion.

5. The device according to claim 3, wherein a space is formed between the gripping portions and a portion of the handle portion.

6. The device according to claim 1, wherein the gripping portions meet along laterally extending edges when said clamping portion is in a retracted position.

7. The device according to claim 1, wherein said clamping portion comprises a longitudinally extending guide and said handle portion comprises a receiving portion adapted to receive said guide.

8. The device according to claim 7, wherein said clamping portion comprises an adjuster, and said handle comprises an adjuster receptacle.

9. The device according to claim 8, wherein said adjuster comprises a threaded pin, and said adjuster receptacle comprises a threaded hole adapted for receiving the threaded pin.

10. The device according to claim 8, further comprising an elastic member disposed between said clamping portion and said handle portion.

11. The device according to claim 7, wherein said guide and said receiving portion interact to prevent rotation of the clamping portion.

12. The device according to claim 11, wherein said clamping portion comprises an adjuster, and said handle comprises an adjuster receptacle.

13. A universal pot lid handling device, comprising:

an elongated handle portion and a clamping portion slidably coupled to said handle portion, wherein said handle portion comprises a fixed jaw at a distal end thereof and said clamping portion comprises a moveable jaw, wherein said fixed jaw and said moveable jaw have opposing, longitudinally extending gripping portions, wherein said fixed jaw and said moveable jaw comprise spacing portions and the gripping portions of said fixed jaw and said moveable jaw extend longitudinally from the respective spacing portions;

wherein each of said longitudinally extending gripping portions comprise a laterally extending edge at a distal end thereof and at least one of said laterally extending edges includes a recess for receiving a projection between adjacent portions of a laterally extending edge, and wherein said clamping portion comprises a longitudinally extending guide and said handle portion comprises a receiving portion adapted to receive said guide.

14. The device according to claim 13, wherein said fixed jaw and said moveable jaw define a space above said opposing, longitudinally extending gripping portions.

15. The device according to claim 13, wherein said clamping portion comprises an adjuster, and said handle comprises an adjuster receptacle.

16. The device according to claim 15, wherein said adjuster comprises a threaded pin, and said adjuster receptacle comprises a threaded hole adapted for receiving the threaded pin.

17. The device according to claim 15, wherein the adjuster comprises a toothed protrusion, and said adjuster receptacle comprises a pawl for engaging with said toothed protrusion.

18. The device according to claim 13, wherein said guide and said receiving portion interact to prevent rotation of the clamping portion relative to the handle portion.

19. The device according to claim 1, wherein, with the exception of the recess or recesses, the laterally extending edges are parallel to one another.

20. The device according to claim 13, wherein, with the exception of the recess or recesses, the laterally extending edges are parallel to one another.

* * * * *